Nov. 29, 1927.
E. L. JENKINSON
1,650,837
GASOLINE FILLING APPARATUS
Filed Sept. 24, 1923    3 Sheets-Sheet 2
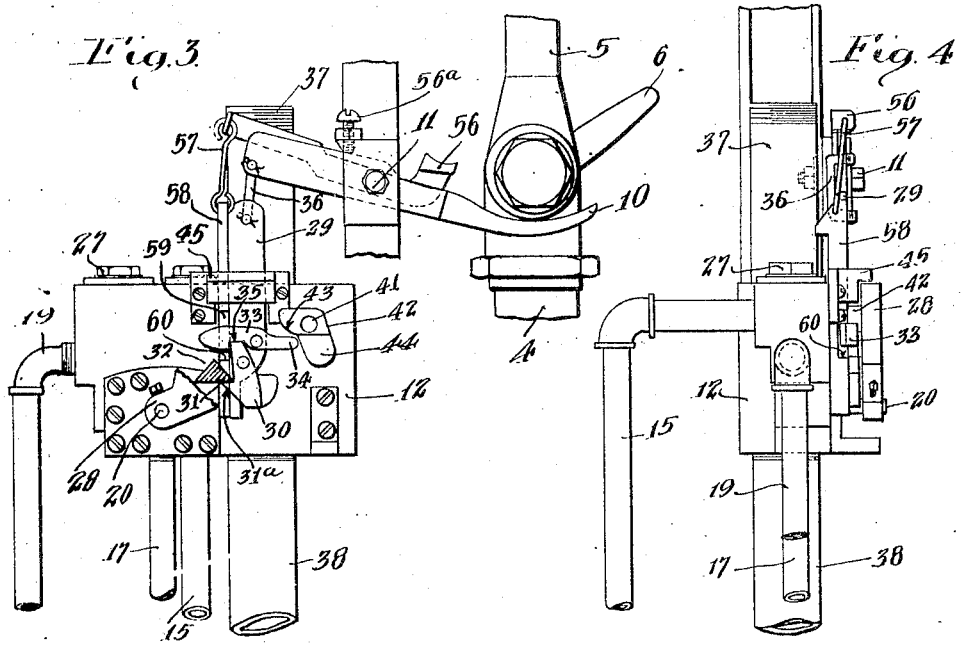
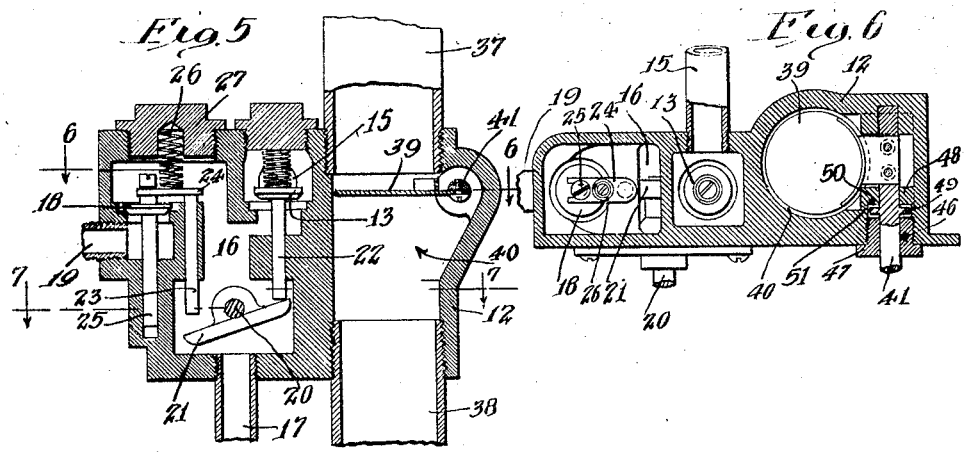
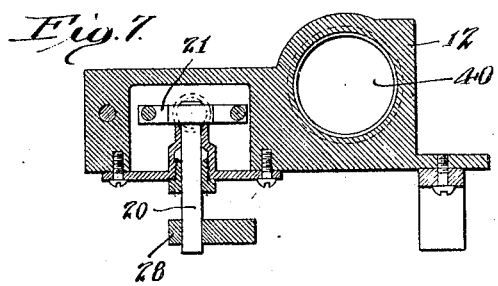

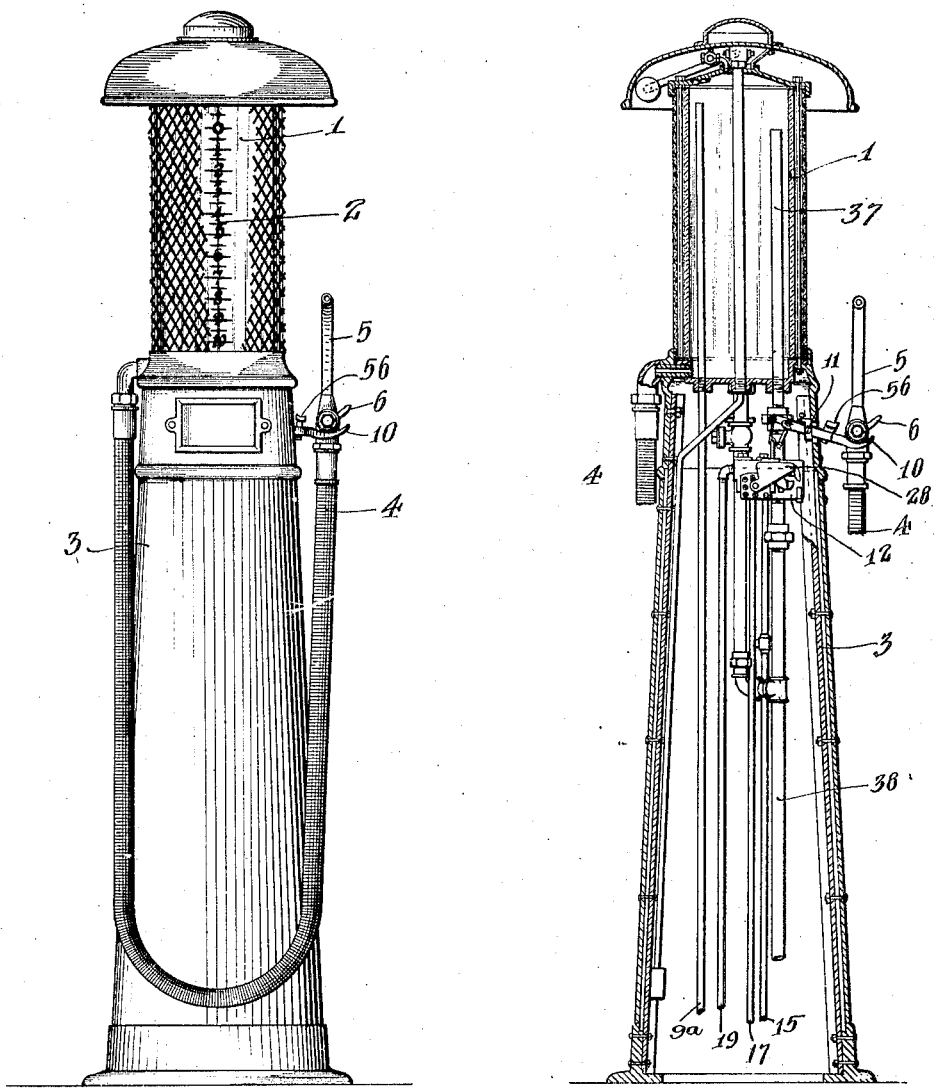

Nov. 29, 1927.
E. L. JENKINSON
1,650,837
GASOLINE FILLING APPARATUS
Filed Sept. 24, 1923      3 Sheets-Sheet 3
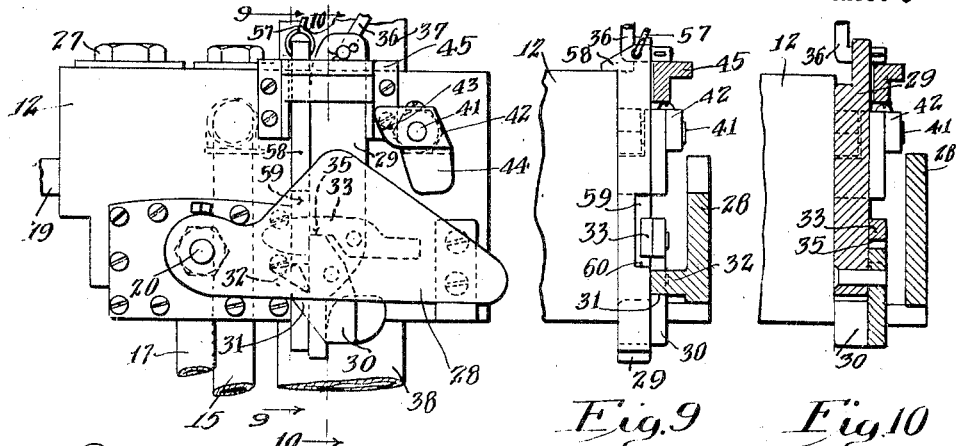
Fig.8   Fig.9   Fig.10
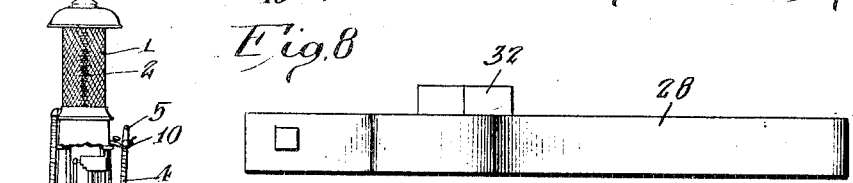
Fig.11
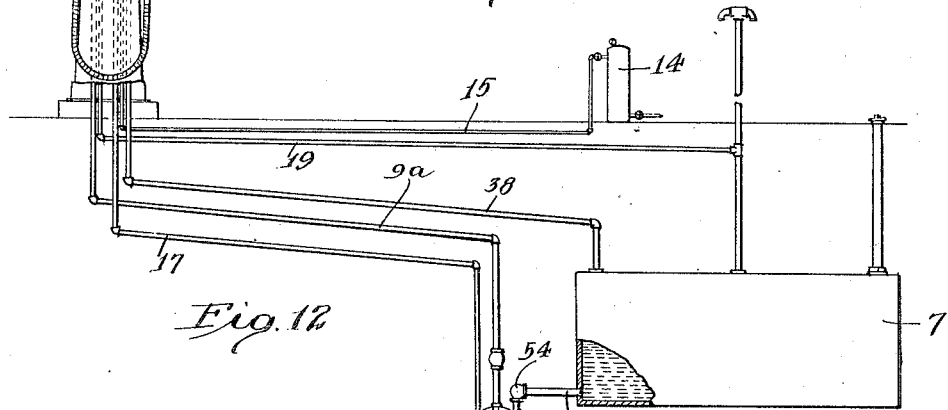
Fig.12
Fig.13
Inventor
Ellis L. Jenkinson
By Lyon & Lyon
Attorneys Patented Nov. 29, 1927.

1,650,837

UNITED STATES PATENT OFFICE.

ELLIS L. JENKINSON, OF SAN JOSE, CALIFORNIA.

GASOLINE FILLING APPARATUS.

Application filed September 24, 1923. Serial No. 664,389.

This invention relates to filling apparatus and while features of the invention may be employed in connection with filling apparatus for use with liquids of any kind, the invention is especially adapted for use in gasoline filling stations. A type of filling apparatus is now in use in such stations which includes an elevated graduated reservoir of glass in which the automobile driver may see the gasoline; the tank in the automobile is filled from this reservoir so that the purchaser of the gasoline can observe the change of level in the elevated reservoir. This type of filling apparatus has become very popular. After the gasoline has been dispensed through a hose from the reservoir, the reservoir is refilled from a sub-tank. Apparatus has been employed in which the flow of gasoline into the reservoir is shut off automatically when the reservoir is filled, by means of a float in the reservoir. An objection to the use of such a float arises from the fact that the action of the float is not sufficiently positive and reliable. The general object of this invention is to provide a filling apparatus having an elevated reservoir, and provided with automatic means for effecting the refilling of the reservoir after the gasoline has been withdrawn from it to fill the tank of an automobile; and to provide reliable means for automatically closing off the flow of the gasoline into the reservoir when the same is full; also to provide the automatic mechanism with hand-actuated means for controlling the apparatus at will.

A further object of the invention is to provide special means for preventing leakage of gasoline from the apparatus.

In the use of apparatus of this kind, where the reservoir is drained rapidly in succession, it sometimes happens that the sub-tank does not fill with sufficient rapidity to keep the reservoir supplied with gasoline.

One of the objects of my invention is to overcome this difficulty and provide means for insuring that the gasoline will flow rapidly from the main tank into the sub-tank.

Further objects of the invention will appear hereinafter.

The invention consists in the novel parts and combination of parts to be described hereinafter, all of which contribute to produce an efficient gasoline filling apparatus.

A preferred embodiment of the invention is described in the following specification while the broad scope of the invention is pointed out in the appended claims.

In the drawing

Figure 1 is a side elevation of a gasoline filling apparatus embodying my invention.

Fig. 2 is a vertical section through the apparatus shown in Figure 1, but showing the gasoline hose broken away, and portions of the hose and nozzle in elevation.

Fig. 3 is a side elevation upon an enlarged scale showing the mechanism of the apparatus which controls the flow of gasoline, certain parts being broken away.

Fig. 4 is an elevation of the parts shown in Figure 3, but viewed from the left end.

Fig. 5 is a vertical section through the apparatus shown in Fig. 3, but upon an enlarged scale, portions of the pipe being broken away and partially shown in elevation.

Fig. 6 is a horizontal section taken substantially on the line 6—6 of Figure 5; this figure and Figure 5 particularly illustrate the pneumatic means for controlling the flow of air to and from the sub-tank for filling the reservoir, and also the means for controlling the pneumatic mechanism, Fig. 7 is a horizontal section taken about on the line 7—7 of Figure 5.

Fig. 8 is a view similar to Figure 3, but showing the apparatus in another position.

Fig. 9 is an elevation in partial section broken away and showing parts of the apparatus of Figure 8 as though viewed on a section taken about on the line 9—9 of Figure 8.

Fig. 10 is a similar view to Figure 9, but taken substantially on the line 10—10 of Figure 8.

Fig. 11 is a plan or top edge view of the weighted lever which I prefer to employ, and which is a detail of the apparatus.

Fig. 12 is a side elevation and partial section showing the general arrangement of the apparatus with the main tank, sub-tank and elevated reservoir, and showing the pipe connections.

Fig. 13 is a vertical section and partial elevation showing the details of a check valve which I employ between the main tank and the sub-tank.

The apparatus includes an elevated reservoir 1 which is preferably formed of glass and provided with a graduated scale 2 having its zero mark at an elevated point and at the level which the gasoline has in the reservoir when the apparatus is in use and ready to fill the tank of an automobile. This reservoir 1 is supported upon a suitable column or pedestal 3. The tank of the car is filled by means of a hose 4 which is in communication with the bottom end of the reservoir and provided with a nozzle 5 having a valve normally closed and controlled by a valve lever 6. When the hose is not in use, it is held supported on a movable member of the automatic apparatus, and I utilize the movements of this member when the hose is hung upon it or removed from it, to effect control of the automatic apparatus, and thereby effect the refilling of the reservoir.

Before proceeding to a detailed description of my automatic apparatus, reference is had to Figure 12, which shows the general arrangement of apparatus which is usually employed. This apparatus includes a main gasoline tank 7 which is placed below the ground line, and the lower portion of this tank is in communication through a pipe 8 with a sub-tank 9. The sub-tank 9 is kept full of gasoline from the main tank 7; and by means of compressed air admitted to the sub-tank above the gasoline level, gasoline from the sub-tank is forced up into the reservoir 1 through a filling pipe 9ª. When the tank of a car is to be filled, the hose 4 is taken from a hook 10 pivotally supported at 11, and the nozzle 5 is then placed so as to direct the gasoline into the automobile tank. The lever 6 is then operated to open the valve of the nozzle 5. After filling the tank of the car, the hose is hung up, that is to say, the nozzle 5 is hung on the hook, as illustrated.

Figure 3 represents the apparatus in the relation which it has immediately after gasoline has been supplied to a car and the nozzle hung upon the hook. The hanging of the nozzle upon the hook controls means including an air reservoir, and automatic mechanism within a casing 12, which automatically effects the admission of compressed air from the reservoir to the sub-tank 9, and thereby forces gasoline from the sub-tank up into the reservoir 1. As soon as the reservoir is filled, the automatic mechanism is tripped automatically, shuts off the flow of the gasoline, and then opens up communication to the atmosphere from the upper end of the sub-tank. This venting of the sub-tank is, of course, necessary to establish atmospheric pressure in the sub-tank, thus allowing it to refill from the main tank; also to prevent dangerous accumulation of gasoline vapors.

The hook 10 constitutes a lever, the inner end of which projects into the casing of the pedestal 3, in which the automatic mechanism is housed. When the nozzle is hung on the hook 10, its weight will depress the outer end of the hook and the inner end will be raised. This movement of the hook opens an air valve 13 which admits compressed air flowing from an air reservoir 14 through an air supply pipe 15, so that this air flows downwardly through an air chest 16 within the casing and passes through an air pipe 17 down into the upper end of the sub-tank 9 above the gasoline level. Within the casing 12, I provide an air vent valve 18, which is closed when the valve 13 is open, but is open when the valve 13 is closed so that when the apparatus is at rest, the upper end of the sub-tank is vented to the atmosphere through a vent pipe 19 which communicates with the air chest 16 through the opening controlled by the vent valve 18.

These valves are automatically controlled by the hook and also through the agency of the overflow from the reservoir when it has become filled from the sub-tank. In order to accomplish this, I provide a rock-shaft 20 carrying a rigid rock lever or cross-head 21, one end of which engages the stem 22 of the air valve 13, and the other end of which engages an operating stem 23 guided in the casing, the upper end of the stem 23 having a cross-head 24, which carries the stem 25 of the air vent valve. A coil spring 26 is pocketed in a bonnet 27 over the vent valve and thrusts down against the cross head 24, and hence the force of this spring exerts itself in a direction to hold these valves in the position shown in Figure 5. A similar spring is provided for valve 13.

I provide means for normally holding the valves in the opposite position from that shown in Figure 5, and for this purpose, I employ a weighted lever 28 which is in the form of a plate rigidly attached to the rock shaft 20. Trip mechanism is provided to connect the hook lever 10 with the plate or weighted lever 28 so that when the nozzle 5 is placed on the hook 10, the weight of the nozzle raises the weighted lever 28 and thereby places the valves 13 and 18 in the position shown in Figure 5. In order to accomplish this, the inner end of the hook lever is connected to a slide 29 guided on the outer face of the casing 12, and the lower end of this slide is provided with a pivoted dog 30, which has a tooth 31, which engages under a substantially triangular lug 32 on the inner face of the plate 28. By engaging with this lug 32, the plate 28 will be raised into an elevated position in which it is indicated in Figure 3, and this will rock the rock shaft 20 and bring it into the position shown in Figure 5. The trip mechanism may have any suitable construction which will operate through the agency of the overflow from the reservoir, to trip the dog 30 and permit the weighted lever 28 to fall back to its normal depressed or horizontal position. In order to accomplish this, I provide the slide 29 with a latch 33, which has a tail 34 beyond its pivot and which has a notch 35 for engaging the upper end of the dog 30 to hold the dog 30 fixed with respect to the slide. The slide 29 is connected to the lever 10 by a suitable link 36.

I shall now describe the means for tripping the latch 33 when the reservoir has become filled. I provide the reservoir with an overflow pipe 37, the upper end of which is at a level with the zero mark of the scale 2. The upper section of this pipe extends downwardly and is attached to the upper side of the casing 12, see Figure 5, so that the gasoline passing down this overflow pipe passes through the casing. The under side of the casing is connected to the lower section 38 of the overflow pipe which leads the overflow gasoline back to the main tank 7. I provide means for tripping the latch 38; this means is located in the path of the overflow gasoline and is actuated by the impact of the gasoline as it descends by gravity in the overflow pipe. This means is in the form of a member such as a spatter plate 39 which extends across the opening 40 in the casing which connects the two sections of the overflow pipe. This spatter plate 39 is secured rigidly to a rock shaft 41, one end of which extends out through the front wall or cover of the casing and carries a tripping pawl 42, see Figure 3, having a cam edge 43, which lies just above the tail 34 of the latch 33, see Figure 3. This pawl 42 has a counter-weight 44 which normally holds the pawl in the position shown in Figure 3, in which position the spatter plate 39 projects horizontally across the passage 40.

When the reservoir 1 is full, the gasoline commences to overflow through the upper end of the overflow pipe 37, and gasoline then falls down the overflow pipe and strikes the plate 39, which rocks the rock shaft 41 in a left hand direction. By this movement, the cam edge 43 raises the latch 33 and releases the dog 30 whereupon the dog 30 under the action of the weight of lever 28, swings away from the lug 32 and permits the weighted lever 28 to fall into the position shown in Figure 8. This closes the air valve 13, and prevents further flow of compressed air to the sub-tank. This movement also opens the vent valve 18.

When the nozzle 5 is taken off the hook 10 to fill the tank in an automobile, the weight of the slide 29 pulls the inner end of the lever 10 down. As this occurs, an inclined under face 31ª of the tooth 31 of the dog 30 comes in contact with a correspondingly inclined upper face on the lug 32, see Figure 3, and this swings the lower end of the slide 29 toward the right. In this connection it should be understood that the slide 29 is not guided at its lower end, but only near its upper end by a small yoke or bracket 45. In this way the slide 29 will swing sufficiently to permit the tooth 31 to engage under the lower face of the lug 32, and this sets the mechanism in its proper relation so that when the nozzle 5 is replaced on the hook, the tripping mechanism including the slide 29 and its associated parts, will raise the weighted lever 29 to the position shown in Figures 2 and 3.

The force exerted by the gasoline spattering down the overflow pipe 37 is, of course, comparatively slight and for this reason, it is not advisable to employ a regular stuffing box with packing to prevent gasoline from passing out through the bearing opening 46, see Figure 6, through which the shaft 41 passes outwardly. In order to prevent gasoline from escaping at this point, thereby insuring the safety of the apparatus, I provide a simple bushing 47 at this point, and I provide a web or baffle 48 in the wall of the casing, which projects across the inner end of the bushing, and a slight distance from it. On the shaft at this point, I provide a collar 49 which is received in a small chamber 50 which is formed between the baffle plate 48 and the inner end of the bushing. The outer face of the collar 49 lies substantially against the inner face of the bushing and tends to prevent any gasoline from working its way out along the shaft. I provide a small drain opening 51 leading from this small chamber back into the overflow pipe. In this way, I prevent gasoline passing out at this point, at the same time providing a construction which permits a very free rotation of the rock shaft 41. When the bushing 47 becomes worn, it can be replaced by another bushing which fits the shaft closely.

In the operation of apparatus of this kind, it may happen that the reservoir 1 may be filled and emptied so rapidly that the sub-tank 9 will not fill fast enough to keep the reservoir supplied. In this connection it should be understood that it is necessary to provide a check valve between the sub-tank and the main tank to prevent a back flow into the main tank when the compressed air is admitted to the sub-tank. Sometimes such a check valve offers a considerable resistance to opening, and when the level of gasoline in the main tank is low, the gasoline flows very slowly through the pipe 8 to the sub-tank. I provide means for overcoming this difficulty, and for this purpose I provide a check valve of special construction which is adapted to open without offering any substantial resistance. This effect may be accomplished in a simple way by providing a check valve in the form of a disc 52 which is normally suspended in a vertical position from a pivot pin 53. If desired, this check valve may be placed in an elbow 54 in the pipe 8, see Figure 13. This disc comes upon a vertical seat 55 and while it operates effectively as a check valve under pressure in the sub-tank, it offers substantially no resistance to the flow of gasoline from the tank 7 to the sub-tank 9.

I provide hand-actuated means for controlling the tripping mechanism at will so as to trip the same, and close off the flow of gasoline from the sub-tank. It may be necessary to do this in case of accident. Without this attachment, if the operator of the apparatus started to fill the reservoir through the operation of hanging the nozzle on the hook 10, he would not be able to prevent the flow of gasoline and it would continue to flow until the reservoir became filled.

In order to provide this hand-control, I provide a small lever 56, with adjusting stop 56a, which may have its fulcrum on the pivot bolt 11 of the hook 10, and the inner end of this lever is connected by a link 57 with a small slide 58 which slides along one edge of the plate or slide 29. The lower end of this releasing slide 58 has a notch 59 in which the nose of the latch 33 has free play. However, if the outer end of the lever 56 is depressed, the shoulder 60 which forms the lower end of this notch 59 will engage the left end of the latch 33 and lift the latch so as to permit the dog 30 to swing on its pivot and release the lug 32 of the plate lever 28.

I shall now describe the general mode of operation of the apparatus. In the normal condition the reservoir 1 stands full of gasoline with the level of the gasoline at the zero mark of the scale 2. In order to fill the tank of the car the operator uses the hose in the regular way keeping the valve lever 6 in the closed position until the nozzle 5 is in the filling opening of the tank. As the gasoline runs into the tank, the operator of the apparatus watches the level of the gasoline in the reservoir 1 and shuts off the flow of gasoline at the gallon mark on the scale 2 which will give the purchaser the amount of gasoline he requires.

Before the operator hangs the nozzle 5 on the hook, the outer end of the hook lever 10 is elevated. The tripping mechanism is then in the relation indicated in Figure 8 and as the slide 29 rises, it pulls up the lug 32 which raises the weighted lever 28 from the position in which it is shown in Figure 8 to the position indicated in Figures 2 and 3. This movement opens the air valve 13 and closes the vent valve 18 thereby permitting flow of compressed air through the pipe 15 from the air supply 14 and past the valve 13, through the air chest 16 and down the air pipe 17 to the sub-tank. The pressure of the air in the sub-tank produces a rapid flow of gasoline through the pipe and fills the reservoir 1. As soon as the reservoir is full to the zero mark of the scale 2, the gasoline commences to overflow through the overflow pipe 37 and the gasoline falling down this pipe strikes the spatter plate 39. This produces a left hand rotation of the shaft 41 and through the agency of the cam edge 43 operating upon the tail 34, raises the latch 33 and releases the pawl 30. The pawl 30 then swings to the right and releases the lug 32, permitting the weighted lever 28 to descend to its depressed or horizontal position. The gasoline which splashes off the plate 39 is prevented from passing through the bearing opening 46, see Figure 6, by means of the baffle wall 48, the collar 49, and the drain passage 51 which drains off the gasoline collecting in the chamber at this point and returns it into the overflow pipe.

The check valve 52, see Figures 12 and 13, operates to open without any considerable resistance and therefore permits quick refilling of the sub-tank 9 from the main tank 7.

It is understood that the embodiment of the invention described herein is only one of the many embodiments this invention may take and I do not wish to be limited in the practice of my invention nor in my claims to the particular embodiment set forth.

What I claim is:

1. In a gasoline filling apparatus, the combination of an elevated reservoir, a hose leading therefrom for dispensing gasoline from the reservoir, a hook for supporting the hose when not in use, means controlled by the hook for effecting the refilling of the reservoir, an over-flow pipe from the reservoir, means actuated by the impact of the gasoline in passing down the over-flow pipe by gravity, and means actuated by the last named means for effecting the shutting off of the flow of gasoline to the reservoir.

2. In a gasoline filling apparatus, the combination of an elevated reservoir, a hose leading therefrom for dispensing the gasoline from the reservoir, a movable hook for supporting the hose when not in use, pneumatic means controlled by the hook for causing a flow of gasoline to the reservoir to refill the same, an over-flow pipe from the reservoir, means actuated by the impact of the gasoline in passing down the over-flow pipe by gravity, and means actuated by the last named means to effect the shutting off of the flow of gasoline to the reservoir.

3. In a gasoline filling apparatus, the combination of an elevated reservoir, a hose leading therefrom for dispensing gasoline from the reservoir, a hook for supporting the hose when not in use, means controlled by the hook for effecting the refilling of the reservoir, an over-flow pipe from the reservoir, means actuated by the impact of the gasoline passing down the over-flow pipe by gravity, means actuated by the last named means to shut off the flow of gasoline to the reservoir, and a hand actuated member also for effecting the shutting off of the flow of gasoline to the reservoir.

4. In a gasoline filling apparatus, the combination of an elevated reservoir, a hose leading therefrom for dispensing the gasoline from the reservoir, a movable hook for supporting the hose when not in use, pneumatic means controlled by the hook for causing a flow of gasoline to the reservoir to refill the same, an over-flow pipe from the reservoir, means actuated by the impact of the gasoline in passing down the over-flow pipe by gravity, means actuated by the last named means for actuating the pneumatic means to shut off the flow to the reservoir, and a hand actuated member for shutting off the flow of gasoline at will.

5. In a gasoline filling apparatus, the combination of an elevated reservoir, a hose leading therefrom for dispensing the gasoline from the reservoir, a movable hook for supporting the hose when not in use, a sub-tank having a filling pipe leading to the reservoir, pneumatic means including an air-valve for admitting compressed air to the sub-tank, and a vent valve for opening communication from the sub-tank to the atmosphere, means for controlling said valves through the agency of the hook to cause a flow of gasoline to the reservoir to refill the same when the hose is supported on the hook, an over-flow pipe from the reservoir, means actuated by the impact of the gasoline in passing down the over-flow pipe by gravity, and means actuated by the last named means to close the air-valve and open the vent valve.

6. In a gasoline filling apparatus, the combination of an elevated reservoir, a hose leading therefrom for dispensing the gasoline from the reservoir, a movable hook for supporting the hose when not in use, a sub-tank with a filling pipe leading therefrom to the reservoir, pneumatic means including an air-valve for admitting compressed air to the sub-tank to cause a flow of gasoline through the filling pipe to the reservoir, and a vent valve for shutting off communication to the atmosphere while the reservoir is filling and for opening communication from the atmosphere to the sub-tank after the reservoir is filled, a weighted lever with means for closing the air-valve and opening the air vent, a trip device for connecting the movable hook with the weighted lever to open the air-valve and close the vent valve when the hose is hung upon the hook, an over-flow pipe from the reservoir, means actuated by the impact of the gasoline flowing down through the over-flow pipe, and means actuated by the last named means to actuate the trip device and thereby release the weighted lever and effect the closing of the air-valve and the opening of the air vent valve.

7. In a gasoline filling apparatus, the combination of an elevated reservoir, a hose leading therefrom for dispensing the gasoline from the reservoir, a movable hook for supporting the hose when not in use, a sub-tank with a filling pipe leading therefrom to the reservoir, pneumatic means including an air-valve for admitting compressed air to the sub-tank to cause a flow of gasoline through the filling pipe to the reservoir, and a vent valve for shutting off communication to the atmosphere while the reservoir is filling and for opening communication from the atmosphere to the sub-tank after the reservoir is filled, a weighted lever having means for closing the air-valve and opening the vent valve, a slide connected with the hook so as to be controlled thereby, a dog on the slide for engaging the weighted lever to raise the same to open the air valve and close the vent valve when the hose is hung upon the hook, an over-flow pipe from the reservoir, and means controlled by the flow of gasoline through the over-flow pipe to trip the dog and release the weighted lever, thereby permitting the weighted lever to close the air valve and open the vent valve.

8. In a gasoline filling apparatus, the combination of an elevated reservoir, a hose leading therefrom for dispensing the gasoline from the reservoir, a movable hook for supporting the hose when not in use, a sub-tank with a filling pipe leading therefrom to the reservoir, pneumatic means including an air-valve for admitting compressed air to the sub-tank to cause a flow of gasoline through the filling pipe to the reservoir, a vent valve for shutting off communication to the atmosphere while the reservoir is filling and for opening communication from the atmosphere to the sub-tank after the reservoir is filled, a weighted lever having means for closing the air-valve and opening the vent valve, a slide connected with the hook so as to be controlled thereby, a pivoted dog on the slide for engaging the weighted lever to raise the same when the hose is hung upon the hook and thereby open the air valve and close the vent valve, a latch mounted on the slide for latching the dog in a fixed position to enable it to raise the weighted lever, an over-flow pipe from the reservoir, and means controlled by the flow of gasoline through the over-flow pipe to actuate the latch and thereby effect the release of the weighted lever, said weighted lever operating to close the air valve and open the vent valve.

9. In a gasoline filling apparatus, the combination of an elevated reservoir, controlling means for controlling the flow of gasoline to the reservoir, an over-flow pipe leading from the reservoir, and having a casing, a shaft, said casing having a bearing opening through which the shaft passes, a spatter plate in the casing mounted on the shaft, means actuated by the spatter plate shaft for actuating the controlling means, a baffle wall projecting across the casing adjacent the said bearing opening and having a chamber behind it and adjacent the bearing opening, to catch gasoline splashed out along the shaft toward the opening, said casing having a drain passage leading from the chamber back into the over-flow pipe and cooperating with the baffle wall to prevent gasoline being forced by the splashing along the shaft to the exterior of the casing.

10. In gasoline apparatus, the combination of a casing into which gasoline splashes, a shaft, said casing having a bearing opening in its wall for the shaft, said shaft having a collar on its inner portion covering the inner end of the bearing opening and guarding it from the splash, said casing having a chamber located at said collar in which the gasoline may accumulate and a drain passage leading from said chamber back into the interior of the casing.

11. In a gasoline filling apparatus, the combination of an over-flow pipe with a casing, valves, means controlled thereby for controlling the flow of gasoline, a spatter plate in the over-flow pipe having a shaft rotatably mounted in the wall of the casing, automatic means controlled by the spatter plate for controlling the valves, a chamber within the casing adjacent the shaft of the spatter plate for catching the gasoline that splashes out along the shaft toward the exterior of the casing, said chamber having a drain passage for leading the gasoline back into the over-flow pipe.

Signed at Los Angeles, California this 14th day of September, 1923.

ELLIS L. JENKINSON.